Jan. 4, 1938. J. A. HAUGHEY 2,104,301
GLASS CUTTING RULE
Filed May 24, 1937   2 Sheets-Sheet 2
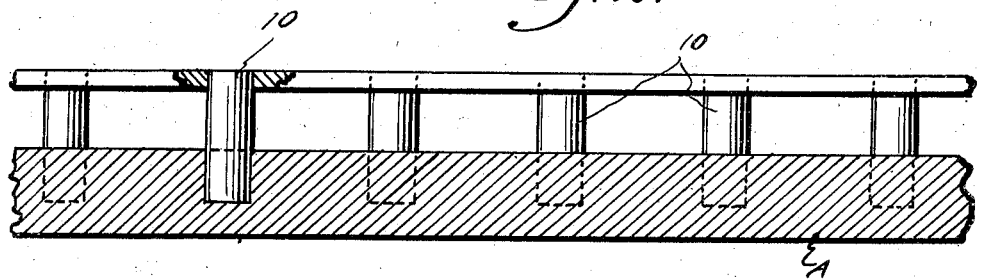
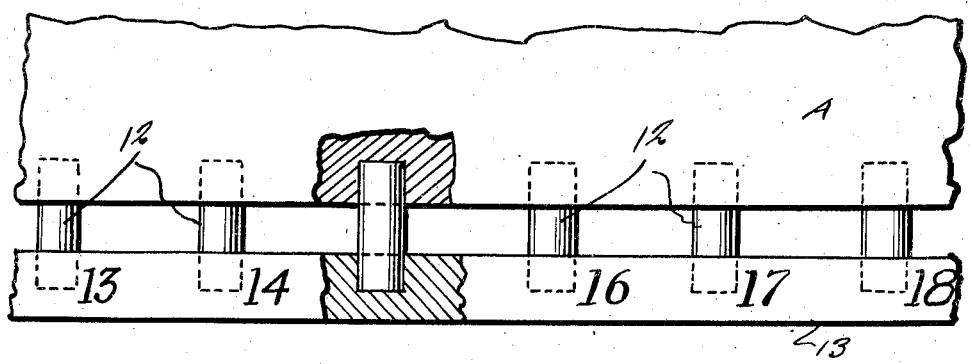
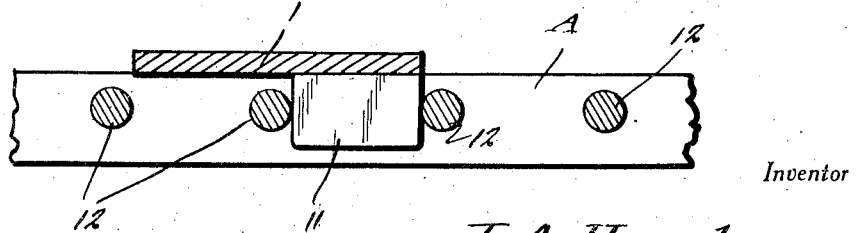
Inventor
J. A. Haughey
By Clarence A. O'Brien
Hyman Berman
Attorneys Patented Jan. 4, 1938

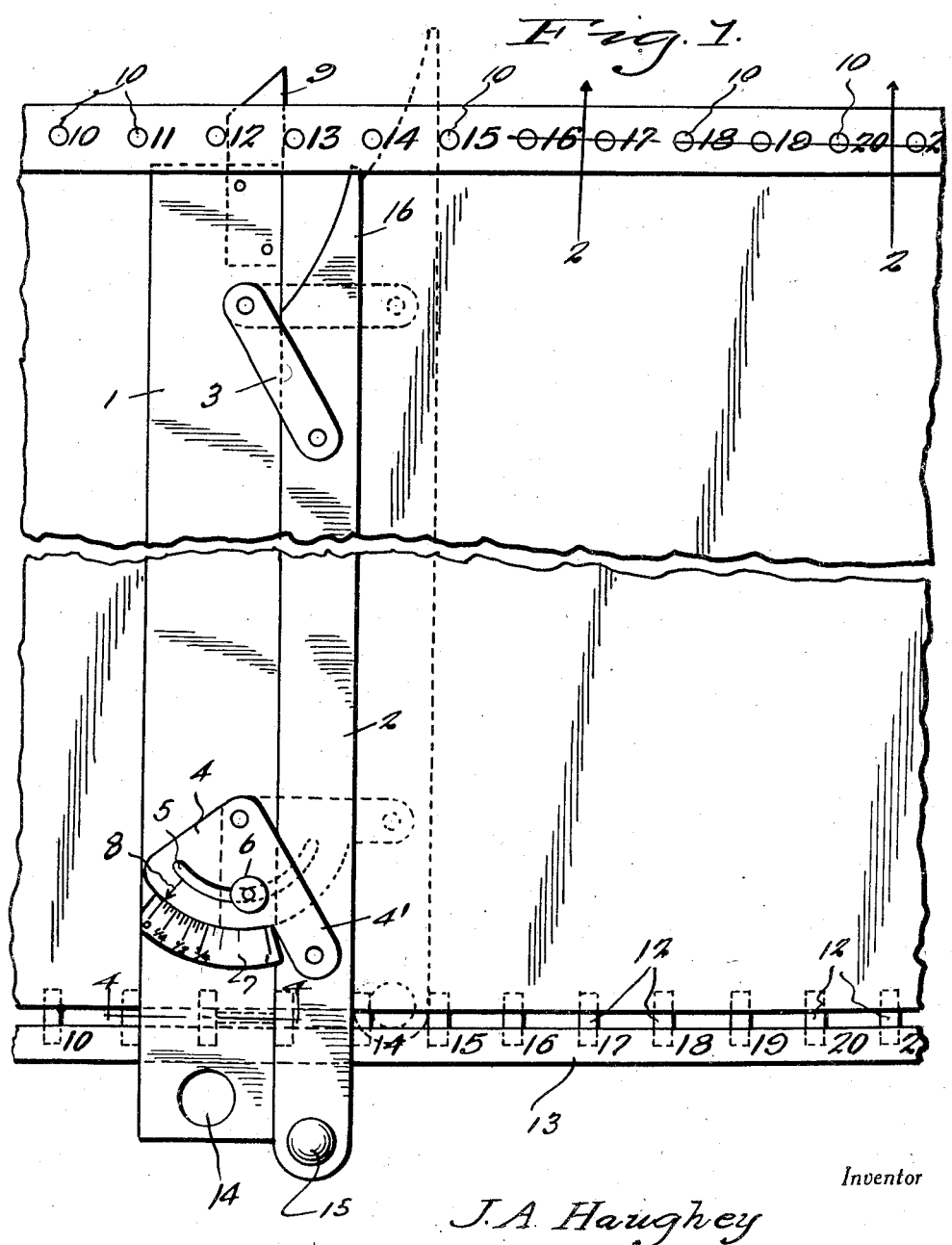

2,104,301

UNITED STATES PATENT OFFICE 2,104,301

GLASS CUTTING RULE

Joshua A. Haughey, Burlington, Colo.

Application May 24, 1937, Serial No. 144,495

1 Claim. (Cl. 33—108)

This invention relates to a glass cutting tool for use on a glass cutting board, the general object of the invention being to provide a parallel ruler, the movable member of which can be quickly adjusted by pressure on a part thereof with a scale to measure the parallel movement.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a plan view showing the invention on a cutting board.

Figure 2 is a section on line 2—2 of Figure 1.

Figure 3 is a fragmentary plan view, with parts in section, showing the scale strip pinned to the edge of the board.

Figure 4 is a section on line 4—4 of Figure 1.

As shown in the drawings, the rule includes the stationary section 1 and the movable section 2, the two sections being connected together by the plain link 3 and the control link 4. This link 4 is of substantially sector shape and is formed with an extension 4', which is pivoted to the movable section 2. An arcuate slot 5 is formed in the link 4 and a stud is carried by the stationary section 1 and passes through the slot to receive a thumb nut 6, which when tightened, holds the link 4 in adjusted position, and this holds the section 2 in adjusted position. A scale plate 7 is attached to the stationary section 1 adjacent the arcuate edge of the link 4 and a mark 8 is carried by the link 4 for cooperating with the scale of this plate for indicating the amount of movement of the movable section 2.

A tip 9 of brass or the like is fastened to one end of the section 1 and projects therefrom and is adapted to pass through the space between two of the pins 10 of the wood scale strip at the top of the board A. A stud 11 of brass or the like extends from the bottom of the section 1 adjacent the other end thereof for fitting between the pins 12 which connect the scale strip 13 with the lower edge of the board. Thus these parts 9 and 11 act to hold the section or member 1 in position on the board.

A hole 14 is formed in that end of the section 1 which carries the projection 11, this end projecting beyond the board when the section 1 is in place, as does the corresponding end of the section 2. This end of the section 2 carries a knob 15 and its other end is reduced, as shown at 16, so that it can pass between two of the pins 10, as shown in dotted lines in Figure 1.

The movable rule 1 is advanced by placing the index finger in the hole 14 and pressing on the end of the rule 2 with the thumb. The retracting knob 15 is provided for returning the rule 2 to the closed position.

It is claimed for this rule that it is much simpler than the rule in general use, which has a machined rack and pinion movement at each end; that it has smoother movement to adjust and fewer wearing surfaces; that it can be produced for much less than the type of rule in common use; that by eliminating the necessity for the etched metal scale it can be used on boards of lower cost than the present types; that it can be used as replacement equipment on boards already in use. It is much lighter in weight and more easily handled. The scale indicates twice as many positions as the metal scale on boards in general use.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:

A rule of the class described comprising a stationary section, projections thereon engaging parts of a support to hold the same stationary, a movable section, links connecting the two sections together and permitting movement of the movable section while the same remains parallel to the stationary section, one link having a segmental portion having an arcuate slot therein, a stud projecting from the stationary section and passing through the slot, a nut on the stud for locking the said link in adjusted position and a scale attached to the stationary section and having an arcuate edge abutting the arcuate edge of the segmental part and said segmental part having a mark thereon for cooperating with the scale.

JOSHUA A. HAUGHEY.